United States Patent [19]

Wicker et al.

[11] Patent Number: 4,735,782
[45] Date of Patent: Apr. 5, 1988

[54] EXTRACTION APPARATUS

[75] Inventors: Alan L. Wicker, Greenfield; Timothy E. Dearth, Indianapolis, both of Ind.

[73] Assignee: Eli Lilly and Company, Indianapolis, Ind.

[21] Appl. No.: 921,738

[22] Filed: Oct. 22, 1986

[51] Int. Cl.4 ............................................. B01D 11/02
[52] U.S. Cl. .................................... 422/275; 422/277; 436/178
[58] Field of Search ............... 436/177, 178, 169, 170; 422/58, 59, 60, 69, 101, 264, 275, 277; 210/436, 472, 262

[56] References Cited

U.S. PATENT DOCUMENTS

| 87,119 | 2/1869 | Snyder . | |
|---|---|---|---|
| 2,095,056 | 10/1937 | Clough | 436/178 |
| 3,733,179 | 5/1973 | Guehler et al. | 436/165 |
| 3,788,483 | 1/1974 | Conway | 210/436 |
| 4,425,438 | 1/1984 | Bauman et al. | 422/59 |
| 4,505,817 | 3/1985 | Blombeck et al. | 436/78 |

FOREIGN PATENT DOCUMENTS 160 of 1854 United Kingdom ................ 210/472
458328 7/1973 U.S.S.R. ............................. 422/100

Primary Examiner—David L. Lacey
Attorney, Agent, or Firm—Barnes & Thornburg

[57] ABSTRACT

An apparatus for extracting at least one selected component from a substrate material, or sample is provided. The apparatus includes a separate first container that is configured to hold an extractant fluid, and a separate second container that is configured to receive at least a portion of this extractant fluid. The apparatus also includes a separate third container that is interposable between the first container and the second container and is configured to contain the substrate material. The apparatus further includes a coupling for joining the third container between the first container and the second container to form an assembly to permit fluid communication between the first container and the second container through the third container, whereby the extractant fluid is permitted to flow from the first container, through the third container and contained substrate material to collect a portion of the selected component of the substrate material, and into the second container.

7 Claims, 2 Drawing Sheets

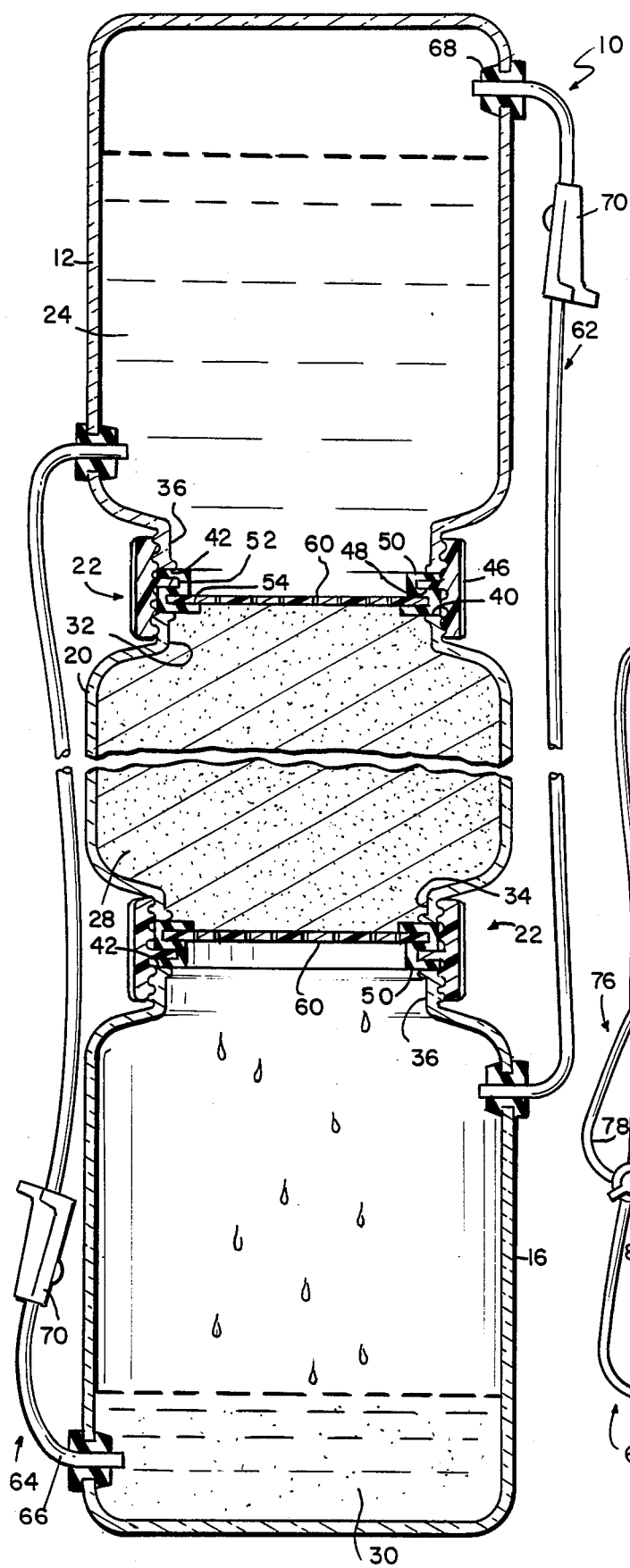
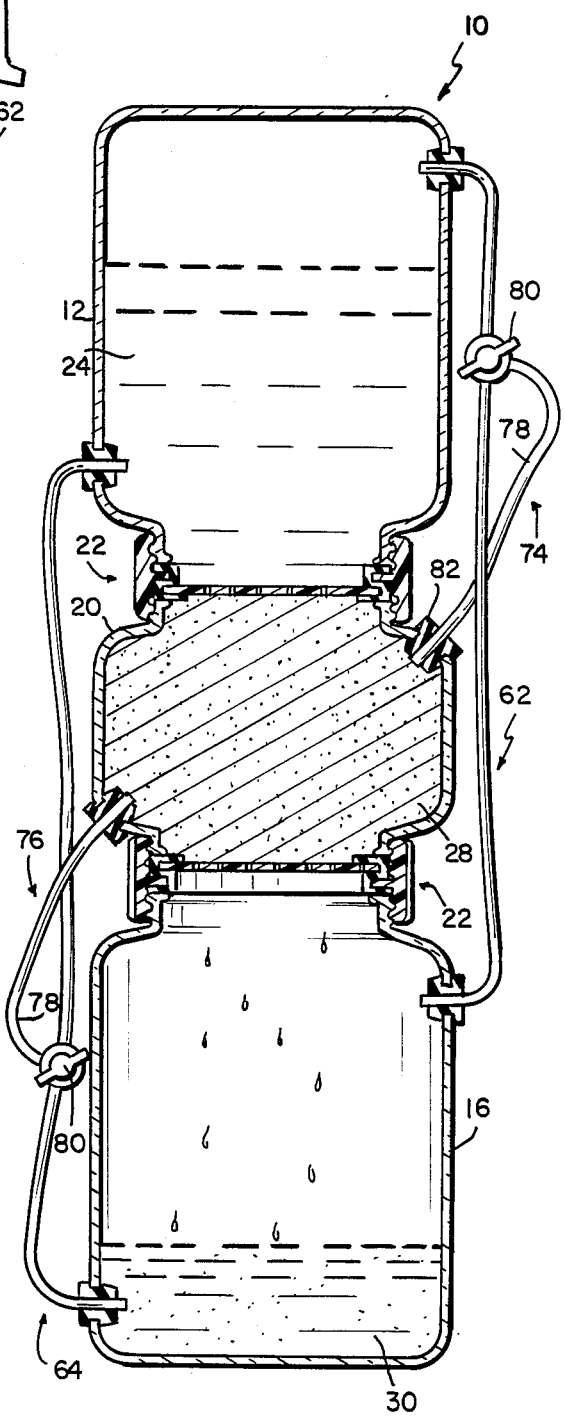
FIG. 1
FIG. 2

EXTRACTION APPARATUS

The present invention relates to an extraction apparatus for extracting one or more selected components from a sample. More particularly, the present invention relates to an extraction apparatus that may be used in the field to extract one or more selected components from a relatively large sample without the need for any lengthy preparation of the sample prior to the extraction procedure.

Conventional methods for the determination of component compositions of a sample, such as a livestock feed sample, generally require that the selected components be extracted from the sample. Because preparation of the sample for extraction is generally time consuming and is generally performed in a laboratory, the normal procedure for extracting the selected components from the sample involves transporting the sample to the laboratory. In the laboratory, the sample is generally first ground to a desired consistency. The sample would then be mixed and may also receive selected additives to enhance the extraction process. The selected components from the ground sample are then extracted using conventional extraction procedures. The extract is then analyzed for the determination of selected components in the sample.

This conventional procedure is generally considered to be inefficient because of a necessity of transporting the samples to the laboratory, and because of the need for grinding the samples to the correct consistency. Further, the delay in extracting the select components may result in an inaccurate quantitative determination because the structure and strength of some components may change over time.

One object of the present invention is to provide and extraction apparatus that is capable of providing an immediate, on site extraction of selected components of a sample.

Another object of the present invention is to provide an extraction apparatus in which the necessity for grinding the sample to a desired consistency is eliminated.

Yet another object of the present invention is to provide an extraction apparatus that is capable of processing a relatively large sample to produce an extract that is more representative without the necessity for grinding the sample to a desired consistency.

Yet another object of the present invention is to provide an extraction apparatus that is simple to use, and that may be assembled and disassembled in the field and transported easily.

According to the present invention, an apparatus for extracting at least one selected component from a sample is provided. The apparatus includes a separate first container that is configured to hold an extractant fluid, and a separate second container that is configured to receive at least a portion of this extractant fluid. The apparatus also includes a separate third container that is interposable between the first container and the second container and is configured to contain the sample. The apparatus further includes means for coupling the third container between the first container and the second container to form an assembly to permit fluid communication between the first container and the second container through the third container, whereby the extractant fluid is permitted to flow from the first container, through the third container and contained sample to collect a portion of the selected component of the sample, and into the second container.

One feature of the foregoing structure is that the apparatus includes a separate first, second, and third container. The separate containers are capable of being coupled together to form the extraction apparatus. One advantage of this feature is that the apparatus may be assembled at the test site, and then disassembled and transported easily to the next site.

Another feature of the foregoing structure is that means for coupling the third container between the first container and the second container to form an assembly to permit fluid communication between the containers is provided. One advantage of this feature is that the separate containers can be assembled on-site to form the extraction assembly.

Another feature of the foregoing structure is that the third container is interposable between the first container and the second container to form the extraction assembly. One advantage of this feature is that when the three containers are joined by the coupling means, the assembly is capable of being oriented such that the extractant fluid is forced through the third container and sample by gravitational force. One advantage of this feature is that the apparatus is capable of operating without any additional components. This increases greatly the simplicity of the device.

In preferred embodiments of the present invention, the apparatus further includes first vent means to permit venting communication between the first container and the second container when the assembly is oriented in a first, generally vertical orientation. One feature of the foregoing structure is that the assembly is vented internally to aid in the flow of the extractant from the first container into the second container. One advantage of this feature is that the assembly does not require venting to the atmosphere, which aids in reducing the chances of contamination of the sample and extractant fluid, and which prevents evaporation of volatile liquids which may be utilized in the extractant fluid.

Also in preferred embodiments of the present invention, the apparatus includes second vent means to permit venting communication between the second container and the first container when the assembly is oriented substantially opposite the first orientation. The opposite orientation is used to redirect the extractant fluid through the sample an additional time to enhance the extraction of the selected component or components. One advantage of this feature is that the apparatus may be oriented in either of two generally vertical orientations, with internal venting capability provided in each orientation. This permits the apparatus to be totally isolated from the ambient atmosphere during the extraction process.

Also in preferred embodiments of the present invention, the apparatus includes third and fourth vent means to permit venting communication between the third container and either the first container or the second container, respectively, when the assembly is oriented in either of the two generally vertical orientations. One feature of the foregoing structure is that the third container and contained sample is vented to the appropriate first or second container to permit filling of the third container with extractant fluid while preventing passage of the extractant fluid from the third container. One advantage of this feature is that the extractant fluid is permitted to flow completely through the sample and not be blocked by air that may otherwise be trapped in the sample.

The present invention thus provides an extraction apparatus that is assembled from individual component parts. The component parts may be assembled in the field on-site to quickly and easily perform the extraction procedure. The assembled apparatus is totally self contained, which reduces the chances of contamination of the sample and evaporation of extractant. The apparatus requires no external, or additional power source to perform the extraction procedure.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

FIG. 1 is a transverse sectional view through the present invention with the components assembled and in use;

FIG. 2 is a transverse sectional view through a modification of the present invention.

DETAILED DESCRIPTION OF THE DRAWINGS

Figure 3:
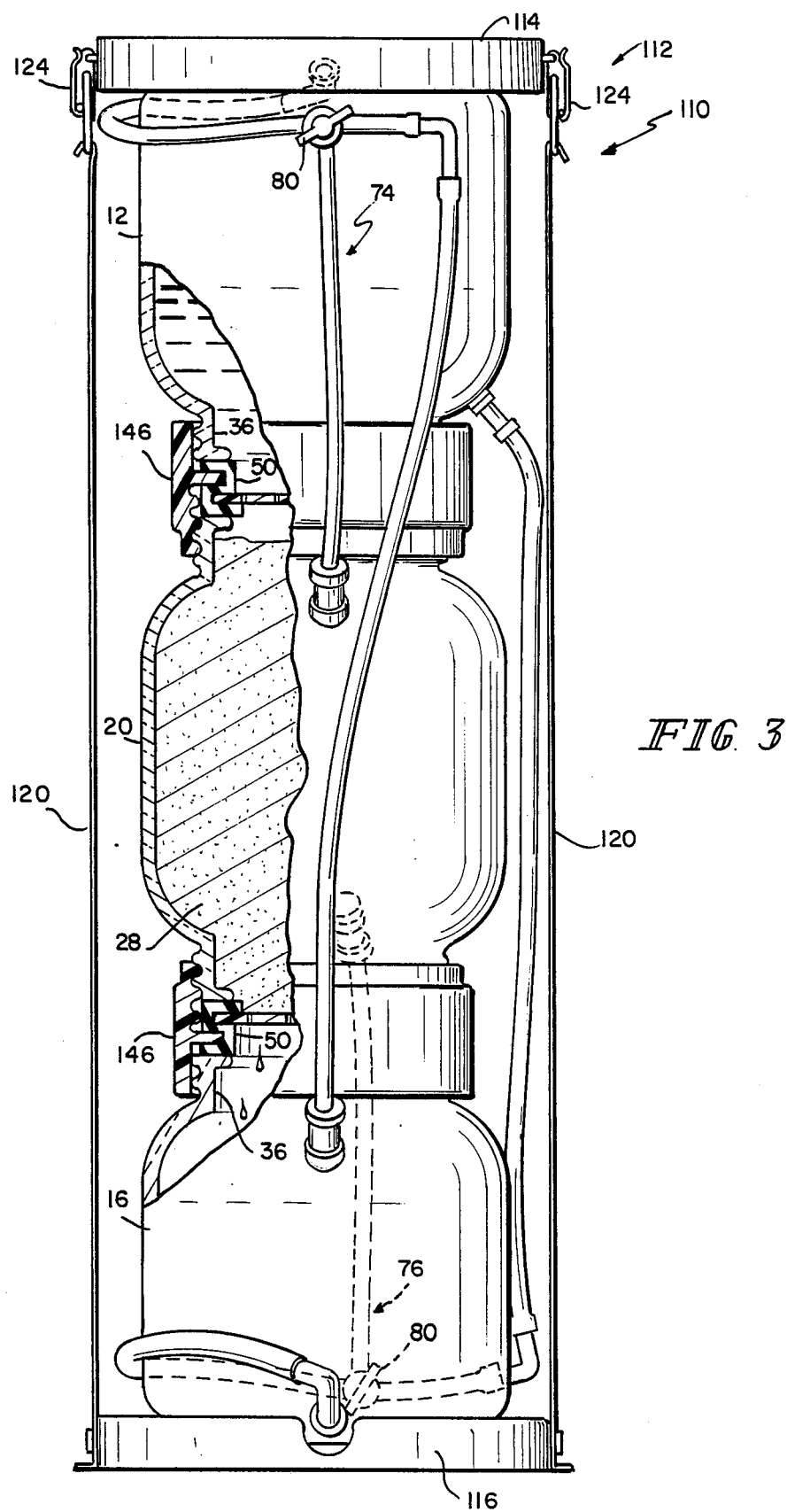
FIG. 3 is a front elevational view of another modification of the present invention with portions broken away.

An extraction assembly 10 for extracting a selected component from a sample is illustrated in FIG. 1. The assembly 10 generally comprises a first container 12, a second container 16, and a third container 20. As shown in FIG. 1, the third container 20 is configured to be interposed between the first container 12 and the second container 16. Identical coupling means 22 are provided to join the first container 12 to the third container 20, and the second container 16 to the third container 20. The first container 12 is configured to contain an extractant fluid 24. The extractant fluid 24 is a conventional fluid, normally a solvent-base fluid, that is selected depending upon the component or components of the samples that are to be extracted. The third container 20 is configured to contain a sample 28. Illustratively, the sample 28 may be a grain or feed sample, such as a livestock feed sample. When the assembly 10 is oriented in a generally vertical orientation as shown in FIG. 1, the extractant fluid 24 is permitted to flow through the sample 28 in a conventional manner. The extractant fluid 24 interacts with the selected component or components of the sample 28 to form an extract fluid 30 that collects in the second container 16. The extract fluid 30 may then be tested for the component composition of the sample 28. The assembly 10 may be reoriented to an orientation opposite that shown in FIG. 1 to permit the extract fluid 30 to flow from the second container 16 through the third container 20 to interact again with the sample 28. This procedure may be repeated a selected number of times depending upon the characteristics of the sample 28 and the extractant fluid 24. It will be understood that the number of times chosen to filter the extractant fluid 24 through the sample 28 may be selected using techniques known by those skilled in the art.

Referring now to FIG. 1, the assembly 10 will be described in greater detail. It will be understood that the terms upper and lower are used to describe the orientation of the assembly 10 as shown in FIG. 1. The third container 20 is a generally cylindrical container having an upper opening 32 and a lower opening 34. The third container 20 is shown broken away to illustrate the fact that the third container 20 may be formed to any selected size depending upon the size of the sample 28 to be analyzed. Illustratively, the third container 20, as well as the first container 12 and second container 16, are formed from a polymeric material such as polypropylene. It will be understood that glass and other materials are equally as suitable. The first container 12 and second container 16 are ideally identical containers, and as such only the details of the first container 12 will be described. It will be understood that the first container 12 and the second container 16 do not have to be identical in order to fulfill the function of the present invention. It will also be understood that the openings 32, 34 of the third container 20 are identical in the embodiments shown in FIG. 1, although the invention is not limited to this configuration.

The openings 32, 34 of the third container terminate in dientical sealing lips 40. The opening 36 of both the first container 12 and the second container 16 terminate in a sealing lip 42. A threaded sleeve 46 is provided to join the opening 36 of the first container 12 to the opening 32 of the third container 20. The threaded sleeve 46 is generally circular and includes threads on its inner surface that mate with threads on the outer surface of both the opening 36 and the opening 32. A radially inwardly extending flange 48 is formed on the inner surface of the threaded sleeve 46 near its center. An S-shaped gasket 50 is provided that engages the flange 48 and seals against both the lip 42 on the first container 12 and the upper lip 40 on the third container 20. The S-shaped gasket is formed to include a radially outwardly facing groove 52 that engages the flange 48. The flange 48 and groove 52 cooperate to rigidly hold the gasket 50 in position near the center of the threaded sleeve 46. The gasket 50 also includes a radially inwardly facing groove 54. A filter disc 60 is provided that is sized to be received within the groove 54 to rigidly hold the disc 60 in position. Illustratively, the filter disc 60 is a fluid-permeable filter that is formed from a polymeric material that does not react with the extract fluid 30, with holes formed through the material. In preferred embodiments, the filter disc 60 is formed from a olefinic resin such as, for example, polypropolyene, with the holes formed in the disc 60 having a diameter of about 0.040 inches to about 0.050 inches.

It will be understood that the threaded sleeve 46, the S-shaped gasket 50, and the filter disc 60 comprise the coupling means 22 that are provided to couple both the first container 12 and the second container 16 to the third container 20.

A first vent means 62 and a second vent means 64 are provided to permit venting communication between the first container 12 and the second container 16. Both the first and second vent means 62, 64 are identical, and only their placement in the first container 12 and second container 16 differ. Each vent means 62, 64 includes a vent tube 66 that is sealingly inserted into the first container 12 and a second container 16 by the use of a stopper 68. A shutoff valve 70 is provided in the vent tube 66 to selectively open and close the vent tube 66 to control the venting communication through each vent means 62, 64.

To assemble the assembly 10 illustrated in FIG. 1, one of the coupling means 22 is threadingly engaged with the axially lower opening 34 of the third container 20. Both the first vent means 62 and the second vent means are then placed in the first container 12 and second container 16 using stoppers 68. Initially, both of the shutoff valves 70 will be closed. It will be understood that a filter disc 60 has been previously placed in the groove 54 of the gasket 50 in the sealing means 22. A sample 28 is then placed in the third container 20. After placing the sample 28 in the third container 20, the other of the coupling means 22 is threadingly engaged with the axially upper opening 32 of the third container 20. It will be understood that, because the first container 12 contains the extractant fluid 24, and the second container 16 is empty, the assembly 10 is constructed prior to use in an orientation opposite the orientation illustrated in FIG. 1. Thus, the first container 12 will be at the axially lower end of the assembly 10 in the assembly process.

After placing the sample 28 in the third container 20, and the coupling means 22 are placed over both of the openings 32, 34, the coupling means 22 adjacent the opening 32 is threadingly engaged with the opening 36 on the first container 12. The gasket 50 is configured to engage both the sealing lip 42 on the first container 12 and the sealing lip 40 on the third container 20 to seal this connection to prevent leakage. Likewise, the second container 16 is threadingly engaged in the coupling means 22 that is adjacent the opening 34 of the third container 20.

In order to begin the extraction process, the assembly 10 having been assembled according to the preceding description, is inverted into the orientation illustrated in FIG. 1. This places the first container 12 and extractant fluid 24 axially above the third container 20 and sample 28. The shutoff valve 70 on the first vent means 62 is opened to permit venting communication between the axially upper portion of the first container 12 and the axially upper portion of the second container 16. Opening the first vent means 62 allows the extractant fluid 24 to begin flowing through the filter disc 60 and through the sample 28. The extractant fluid 24 interacts with the selected component or components of the sample 28, forming an extract 30. The extract 30 flows through the axially lower filter disc 60 and into the second container 16. After all of the extractant fluid 24 has passed through the sample 28, and collected in the second container 16 the extraction procedure may be considered completed. If this is the case, a small aliquot of the extractant 30 in the second container 16 is removed and analyzed for a determination of the component composition of the sample 28.

Depending upon the composition of the sample 28 and the extractant fluid 24, it may be desirable to filter the extract 30 through the sample 28 one or more additional times. This is done simply by closing the shutoff valve 70 on the first vent means 62 and inverting the entire assembly 10 to an orientation opposite that illustrated in FIG. 1. The shutoff valve 70 on the second vent means 64 is then opened to permit the extract 30 in the second container 16 to flow through the sample 28 and collect in the first container 12. This procedure can be repeated any number of times, with the number of times chosen depending upon characteristics that are well known to those skilled in the art.

FIG. 2 shows another embodiment of the present invention which includes selective venting capability between the third container 20 and both the first container 12 and second container 16. It has been found that under certain circumstances, as the extractant fluid 24 enters the axially upper portion of the sample 28, that wetting of the sample 28 may trap air in the third container 20 reducing the contact between the extractant fluid 24 and the sample 28. A third vent means 74 and fourth vent means 76 are provided to permit selective venting communication between the third container 20 and both the first container 12 and second container 16. Both the third vent means 74 and fourth vent means 76 include a vent tube 78 that extends between the third container 20 and a shutoff valve 80.

It will be understood that the first vent means 62 and the second vent means 64 have been modified to separately include a shutoff valve 80 which replaces the shutoff valve 70 in the embodiment illustrated in FIG. 1. Each vent tube 78 is sealingly inserted into the third container 20 by a stopper 82.

When the assembly 10 is in the orientation illustrated in FIG. 2, the shutoff valve 80 is opened to permit venting communication between the first container 12 and the third container 20 until the sample 28 is completely wetted. If required by the nature of the component or components and the extractant, the extractant may be maintained in the third container 20 for any desired period of time. When desired, the shutoff valve 80 is closed to prevent venting communication between the first container 12 and the third container 20 then the shutoff valve 80 is opened to allow venting communication between the second container 16 and the third container 20. This allows the extractant to proceed downward into the second container 16. It will be understood that when the assembly 10 is inverted to an orientation opposite that illustrated in FIG. 2, the third vent means 74 is closed by the shutoff valve 80, and the fourth vent means 76 is opened corresponding to the procedure described above relating to FIG. 1.

FIG. 3 shows another embodiment of the invention that is a modification of the embodiment illustrated in FIG. 2. Those elements referenced by numbers identical to those in FIGS. 1 and 2 perform the same or similar function. FIG. 3 shows an extraction apparatus 110 in which the coupling sleeves 146 are threaded only for attachment to the third container 20. The first container 12 and second container 16 are held in contact with the third container 20, and specifically in contact with the S-shaped gasket 50 by a clamping arrangement 112. This permits easier assembly of the apparatus 110 compared to the apparatus 10 illustrated in FIGS. 1 and 2.

The clamping arrangement 112 includes a first platform 114 that is configured to receive the base of the first container 12 and a second platform 116 that is configured to receive the base of a second container 16. Straps 120 are provided that are attached to opposite sides of the second platform 116. The straps 120 extend toward the first platform 114, and are coupled to the first platform 114 by clamps 124. Illustratively, the clamps 124 are conventional over-center clamps that are used to impart tension upon the straps 120 to force the first container 12 and second container 16 into sealing engagement with the S-shaped gaskets 50 in the sleeves 146. It will be understood that other types of clamps 124 could be utilized, as well as other types of interconnecting straps 120 to perform the same function. Although not shown, the shut-off valves 80 in both the third vent means 74 and fourth vent means 76 may be mounted on the first platform 114 and second platform 116, respectively, to further facilitate the assembly of the extraction assembly 110. It will be understood that the extraction assembly 110 is easier to assemble than the extraction assembly 10 illustrated in FIG. 2 because the first container 12 and second container 16 do not need to be rotated to threadingly engage these containers into the sleeves 146. Thus, the first container 12 and second container 16 are simply inserted into the sleeves 146 to contact the S-shaped gaskets 50, with the clamping arrangement 112 providing the force necessary to hold the extraction assembly 110 in the assembled orientation.

The present invention provides an extractant apparatus that is easily transported and assembled in the field to permit an on-site extraction of a sample. The apparatus eliminates the need for transporting the entire sample to the laboratory for processing and extraction. It has been found that using the extraction assembly 10 of the present invention results in a component determination that is highly accurate, and much simpler than conventional methods. The assembly 10 is constructed from easily available components and is entirely self contained.

Although the invention has been described in detail with reference to certain preferred embodiments, variations and modifications exist within the scope and spirit of the invention as described and defined in the following claims.

What is claimed is:

1. An extraction apparatus for extracting a portion of at least one selected component from a substrate material, the apparatus comprising:
   a separate first vessel for containing an extractant fluid, said first vessel formed to including an orifice,
   a separate second vessel for to receive an extractant fluid, said second vessel formed to including an orifice,
   a separate third vessel for containing a substrate material, said third vessel including a first opening and a second opening,
   first means connecting said first vessel orifice to said first opening of said third vessel to permit fluid communication between said first vessel and said third vessel,
   second means connecting said second vessel orifice to said second opening of said third vessel to permit fluid communication between said second vessel and said third vessel, whereby extractant fluid is permitted to flow from said first vessel through said third vessel containing a substrate material, and into said second vessel as an extract composed of the extractant fluid and at least one selected component form the substrate material,
   first vent means external to said first and second vessels for permitting venting communication between said first vessel and said second vessel when said first vessel, said third vessel, and said second vessel are oriented in a first substantially vertical arrangement in which said third vessel is interposed between said first vessel and said second vessel, said first vent means including a hose connected between said first vessel and said second vessel,
   second vent means for permitting venting communication between said first vessel and said second vessel when said first vessel, said third vessel, and said second vessel are oriented in substantially opposite arrangement from said first vertical arrangment, said second vent means including a hose connected between said second vessel and said first vessel,
   closure means included in said first vent means and said second vent means for selectively permitting venting communication between said first vessel and said second vessel, and
   third vent means for selectively permitting venting communication between said third vessel, said first vessel, and said second vessel when said first vessel, said third vessel, and said second vessel are oriented in said first vertical arrangement, said third vent means including a hose connected between said third vessel and said first vent means.

2. The apparatus of claim 1, wherein said first and second connecting means each comprises fluid-permeable filter means adapted to prevent passage of a substrate material from said third vessel.

3. The apparatus of claim 1, further comprising fourth vent means for selectively permitting venting communication between said third vessel, said second vessel, and said first vessel, when said first vessel, said third vessel, and said second vessel are oriented substantially opposite said first vertical arrangement, said fourth vent means including a hose connected between said third vessel and said second vent means.

4. An apparatus for extracting at least one selected component from a substrate material, the apparatus comprising,
   a separate first container configured to hold an extractant fluid,
   a separate second container configured to receive at least a portion of an extractant fluid.
   a separate third container interposable between said first container and said second container and configured to contain a substrate material,
   means coupling said third container between said first containing and said second container to form an assembly to permit fluid communication between said first container and said second container through said third container, whereby extractant fluid is permitted to flow from said first container, through said third container and contact substrate material to collect a portion of at least one selected component of the substrate material, and into said second container,
   first vent means for permitting venting communication between said first container and said second container when said assembly is oriented in a first generally vertical orientation, said first vent means including a hose connected between said first container and said second container,
   second vent means for permitting venting communication between said second container and said first container when said assembly is oriented substantially opposite said first orientation, said second vent means including a hose connected between said second container and said first container, and wherein said first vent means and said second vent means include a closure means for selectively permitting venting communication between said first and second vessels, and
   third vent vent means for selectively permitting venting communication between said third container, said first container, and said second container when said assembly is oriented in said first orientation, said third vent means including a hose connected between said third container and said first vent means.

5. The apparatus of claim 4, wherein said coupling means comprises fluid-permeable filter means interposed between said first container and said third container, and between said second container and said third container, said filter means positioned and arranged to retain substrate material in said third container.

6. The apparatus of claim 5, wherein said coupling means further comprises clamping means for releasably securing said first container, said second container, and said third container to form said assembly.

7. The apparatus of claim 4, further comprising fourth vent means for selectively permitting venting communication between said third container, said second container, and said first container when said assembly is oriented substantially opposite said first orientation, said fourth vent means including a hose connected between said third container and said second vent means.

* * * * *

UNITED STATES PATENT AND TRADEMARK OFFICE
CERTIFICATE OF CORRECTION

PATENT NO.   : 4,735,782
DATED        : April 5, 1988
INVENTOR(S)  : Wicker et al.

It is certified that error appears in the above-identified patent and that said Letters Patent is hereby corrected as shown below:

In column 1, line 36, replace "and" with -- an --.

In column 4, line 22, replace "dientical" with -- identical --.

In column 7, line 32, replace "including" with -- include --.

In column 7, line 34, replace "to receive" with -- receiving --.

In column 7, line 35, replace "including" with -- include --.

In column 8, line 62, delete "vent" (second occurrence).

Signed and Sealed this

Twenty-seventh Day of September, 1988

*Attest:*

DONALD J. QUIGG

*Attesting Officer*     *Commissioner of Patents and Trademarks*